United States Patent
Santhoff et al.

(10) Patent No.: US 6,519,464 B1
(45) Date of Patent: Feb. 11, 2003

(54) USE OF THIRD PARTY ULTRA WIDEBAND DEVICES TO ESTABLISH GEO-POSITIONAL DATA

(75) Inventors: John H. Santhoff, Panama City Beach, FL (US); Rodolfo T. Arrieta, Panama City Beach, FL (US)

(73) Assignee: Pulse-Link, Inc., San Diego, CA (US)

( * ) Notice: Subject to any disclaimer, the term of this patent is extended or adjusted under 35 U.S.C. 154(b) by 0 days.

(21) Appl. No.: 09/745,498

(22) Filed: Dec. 22, 2000

Related U.S. Application Data

(60) Provisional application No. 60/255,469, filed on Dec. 13, 2000.

(51) Int. Cl.⁷ .................................................. H04Q 7/20
(52) U.S. Cl. ........................ 455/456; 455/525; 342/450
(58) Field of Search ................................ 455/456, 457, 455/524, 525; 342/450, 457, 458, 463, 464, 465; 701/200, 300

(56) References Cited

U.S. PATENT DOCUMENTS

| | | | |
|---|---|---|---|
| 3,668,639 A | 6/1972 | Harmuth | 340/166 R |
| 3,678,204 A | 7/1972 | Harmuth | 179/15 BC |
| 4,506,267 A | 3/1985 | Harmuth | 343/744 |
| 4,641,317 A | 2/1987 | Fullerton | 375/1 |
| 4,651,152 A | 3/1987 | Harmuth | 342/13 |
| 4,743,906 A | 5/1988 | Fullerton | 342/27 |
| 4,799,062 A * | 1/1989 | Sanderford, Jr. et al. | 342/450 |
| 4,813,057 A | 3/1989 | Fullerton | 375/37 |
| 4,979,186 A | 12/1990 | Fullerton | 375/23 |
| 5,134,408 A | 7/1992 | Harmuth | 342/21 |
| 5,148,174 A | 9/1992 | Harmuth | 342/21 |
| 5,153,595 A | 10/1992 | Harmuth | 342/22 |
| 5,159,343 A | 10/1992 | Harmuth | 342/22 |
| 5,307,081 A | 4/1994 | Harmuth | 343/842 |
| 5,363,108 A | 11/1994 | Fullerton | 342/27 |
| 5,365,240 A | 11/1994 | Harmuth | 343/701 |
| 5,493,691 A | 2/1996 | Barrett | 455/20 |
| 5,523,758 A | 6/1996 | Harmuth | 342/22 |
| 5,586,145 A | 12/1996 | Morgan et al. | 375/239 |
| 5,592,177 A | 1/1997 | Barrett | 342/361 |
| 5,610,907 A | 3/1997 | Barrett | 370/342 |
| 5,677,927 A | 10/1997 | Fullerton et al. | 375/200 |
| 5,687,169 A | 11/1997 | Fullerton | 370/324 |
| 5,901,172 A | 5/1999 | Fontana et al. | 375/200 |
| 5,960,355 A * | 9/1999 | Ekman et al. | 455/456 |
| 6,031,862 A | 2/2000 | Fullerton et al. | 375/200 |

* cited by examiner

*Primary Examiner*—Nguyen T. Vo
(74) *Attorney, Agent, or Firm*—Luce, Forward, Hamilton & Scripps LLP

(57) ABSTRACT

A system, method and article of manufacture are provided for determining a location of a wireless device in a wireless communication system. In general, an initial request is transmitted to wireless devices having known locations for positioning information so that a location can be determined for a first wireless device having an undetermined location. Those wireless devices with known locations that receive the initial request in turn transmit positioning information to the first wireless device. If positioning information from less than a sufficient number of wireless devices with known location is received by the first mobile wireless device, an additional request is then transmitted for responses from these responding other wireless devices. After responses to the request from one or more of these responding other wireless devices are received, communication then occurs with at least a portion of the responding wireless devices to obtain information relating to the distance between the first wireless device and the responding wireless devices it is communicating with. Next, a location of the first wireless device is estimated using the information obtained from these responding other wireless devices and the positioning information received from the wireless devices with known locations.

33 Claims, 9 Drawing Sheets

USE OF THIRD PARTY ULTRA WIDEBAND DEVICES TO ESTABLISH GEO-POSITIONAL DATA

Priority is claimed from co-pending United States Provisional Patent Application Serial No. 60/255,469, filed Dec. 13, 2000, entitled "Ultra-Wideband Communication System and Method", which is referred to and incorporated herein in its entirety by reference.

FIELD OF THE INVENTION

The present invention relates generally to wireless communication systems and, more particularly, to accurate geo-location of ultra wideband transceivers.

BACKGROUND OF THE INVENTION

Ultra wideband communication systems and devices benefit from the tremendous potential for geo-positional accuracy of ultra wideband technology. As a separate issue, the FCC has recently required all existing cellular technology providers to employ some means of geographically locating all cellular phones for emergency purposes. This initiative has been termed "e911" and will be a requirement of future cellular technologies. Thus, it is foreseeable that the same demands will be placed on future ultra wideband devices.

Conventionally, ultra wideband geo-positional information may be obtained by triangulating signals from three separate ultra wideband transmission towers whose fixed position is known. However, it is foreseeable that a mobile ultra wideband device may not always be within range of three fixed transmission towers. In such a situation, the ultra wideband device's geo-location (i.e., geo-position) may not be determined through the conventional methods.

Thus, it may be appreciated that a geo-location method that takes advantage of other mobile ultra wideband devices of known location to derive the position of the ultra wideband device that is in need of location has a better chance of success in these circumstances.

SUMMARY OF THE INVENTION

A system, method and article of manufacture are provided for determining a location of a wireless device in a wireless communication system. In general, an initial request is transmitted to wireless devices having known locations for positioning information so that a location can be determined for a first wireless device having an undetermined location. Those wireless devices with known locations that receive the initial request in turn transmit positioning information to the first wireless device. If positioning information from less than a sufficient number of wireless devices with known location is received by the first mobile wireless device, an additional request is then transmitted for responses from other responding wireless devices. After responses to the request from one or more of these responding other wireless devices are received, communication then occurs with at least a portion of the responding wireless devices to obtain information relating to the distance between the first wireless device and the responding wireless devices it is communicating with. These responding other wireless devices may also respond to the request by polling for its own geo-location from more distant known-location devices thus producing a request that propagates through an ad hoc network. Alternatively, in some circumstances, they may simply provide a distance to the first mobile wireless device. An example of such a circumstance is a lost child carrying the first wireless device and several searchers, each with a responding wireless device. In this example, the searchers are not interested in the geo-position of the child, but in the child's distance from each of the searchers. In this scenario a local triangulation without a geopositional reference is all that is required to find the child. Thus, a location of the first wireless device is estimated using the information (distance or location) obtained from the responding other wireless devices and the positioning information received from the wireless devices with known locations.

In one aspect of the present invention, at least a portion of the wireless devices may comprise impulse radio devices. In an additional aspect of the present invention, the sufficient number of wireless devices with known locations may comprise three or more wireless devices with known locations. In another aspect of the present invention, at least a portion of the transmitted requests may be coded.

In a further aspect of the present invention, the additional request may be re-transmitted periodically a predetermined number of times. In such an aspect, the additional request may also be re-transmitted at a higher power level if an insufficient number of responses are received in response to the previous transmissions of the additional request. In yet another aspect of the present invention, the obtained information relating to the distance between the first wireless device and the portion of the responding other wireless devices may include a calculated distance between the first wireless device and the portion of the responding other wireless devices, and a scaling factor.

In one embodiment of the present invention, the estimated location may be stored in a memory of the first wireless device. In a further embodiment of the present invention, the obtained information may also be utilized to update an internal clock of the first wireless device.

In another embodiment of the present invention, if positioning information is received from a sufficient number of wireless devices with known locations, then the location of the first wireless device may be determined utilizing just the information obtained from the wireless devices with known locations. In yet another embodiment of the present invention, the location of the first wireless device may be estimated using only the information obtained from the portion of the responding other wireless device if no positioning information is received by the first mobile wireless device from wireless devices having known locations.

BRIEF DESCRIPTION OF THE DRAWINGS

The foregoing and other features, aspects and advantages are better understood from the following detailed description, appended claims, and accompanying drawings where:

DETAILED DESCRIPTION OF THE INVENTION

Embodiments of the present invention use the known geographic position of one or more mobile wireless devices (in a preferred embodiment, ultra wideband devices) to triangulate the position of additional mobile wireless devices that are not within geographic range of three fixed wireless devices such as base stations and/or transmission towers. It should be understood that the mobile wireless devices whose positions are known need not be restricted just to handheld-type mobile devices. Such devices may also include ultra wideband components in mobile phones, mobile internet devices, portable radios, personal data assistants, desktop computers or appliances located in homes, automobiles, office environments and similar applications.

Figure 1:
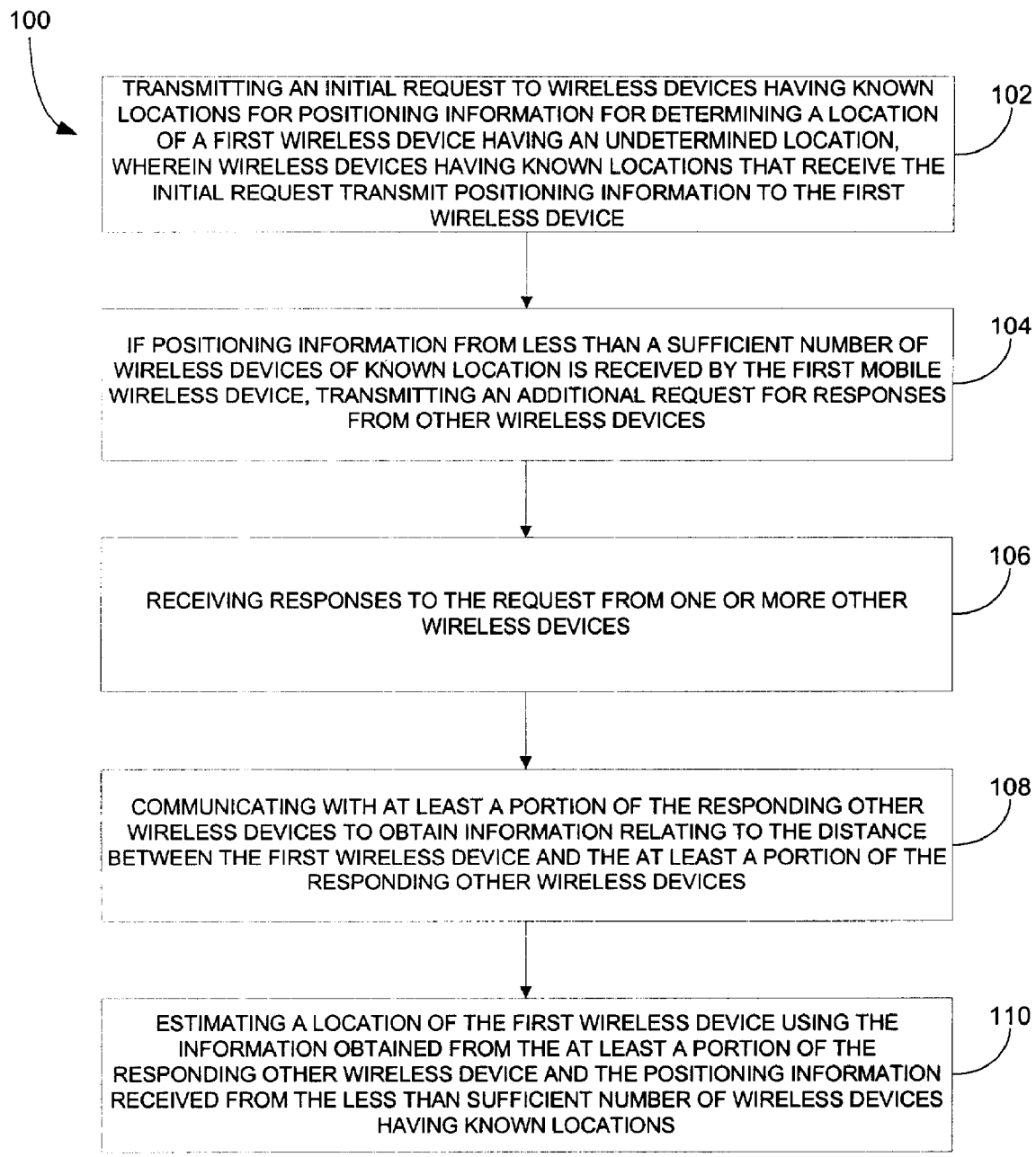
FIG. 1 is a schematic diagram of an exemplary ultra wideband communication system capable of utilizing a multiple access scheme in accordance with an embodiment of the present invention.

FIG. 1 is a flowchart of a process 100 for determining a geographic location of a mobile wireless device having an undetermined/unknown geographic location in a wireless communication system in accordance with an embodiment of the present invention. In operation 102, at least one initial request is transmitted from a first mobile wireless device having an undetermined/unknown geographic location to fixed position wireless devices having known geographic locations (e.g., such as base stations and/or transmission towers) for positioning information for determining a geographic location of the first mobile wireless device. Those fixed position wireless devices with known geographic locations that receive the initial request (i.e., in the communication range of the first mobile wireless device) transmit, in response, positioning information to the first mobile wireless device with the undetermined geographic location (Note: for purposes of this portions of the description, communication range may be defined as a region inside which wireless communication with the first mobile wireless device may be achieved).

If positioning information from less than a sufficient number of fixed position wireless devices of known geographic location is received by the first mobile wireless device (e.g., such as when less than the sufficient number of fixed position wireless devices are in the communication range of the first mobile wireless device), then in operation 104, the first mobile wireless device then transmits an additional request for responses/replies from other mobile wireless devices in the communication range of the first mobile wireless device. In one aspect of the present invention, at least a portion of the transmitted requests may be coded (such as in the form of a key sequence request). Responses to the request are then received by the first wireless device from one or more other mobile wireless devices in the communication range in operation 106. Communication is then initiated in operation 108 with at least a portion of the responding other mobile wireless devices to obtain information (i.e., data) relating to the distance between the first mobile wireless device and the responding other mobile wireless devices communicating with the first mobile wireless device.

In operation 110, a position/location of the first mobile wireless device is then estimated with a triangulation method using the information obtained from the responding other mobile wireless device communicating with the first wireless device and (if any was received by the first mobile wireless device) positioning information received from the less than sufficient number of fixed position wireless devices with known geographic locations.

In an aspect of the present invention, the sufficient number of fixed position wireless devices with known geographic locations may comprises at least three fixed position wireless devices with known geographic locations. In another aspect of the present invention, the additional request (see operation 104) may be re-transmitted periodically a predetermined number of times. In such an aspect, the additional request may be re-transmitted at a higher power level (i.e., to increase the range that the additional request is transmitted from the first mobile wireless device) if an insufficient number of responses are received (after a predetermined amount of time) in response to the previous transmission of the additional request.

Figure 2:
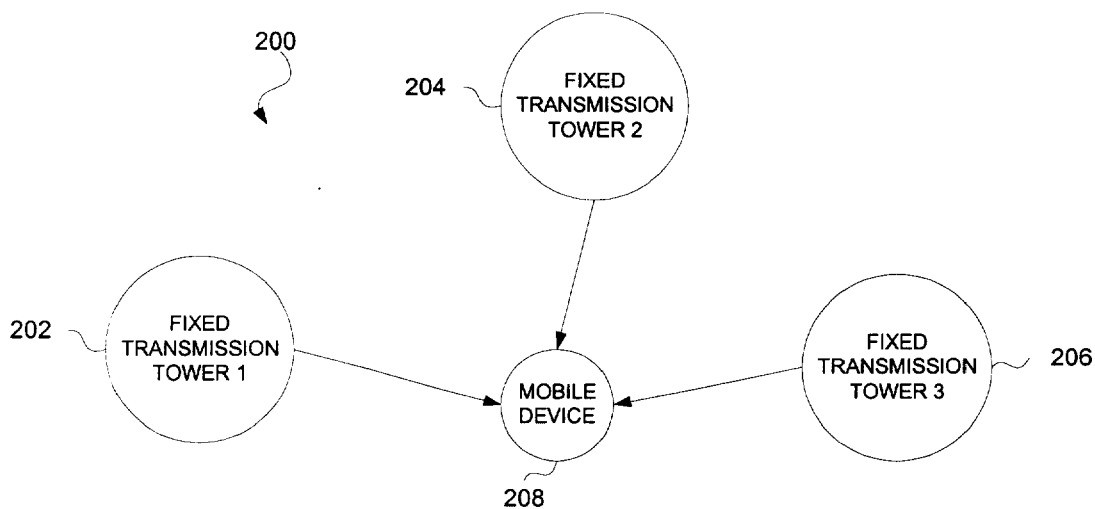
FIG. 2 is a schematic diagram of an ultra wideband geo-positional model.

FIG. 2 is a schematic diagram of an ultra wideband geo-positional model 200 where fixed, known position wireless devices such as transmitters/base stations 202, 204, 206 collaborate with a requesting wireless device 208 to allow the requesting device to determine its location in accordance with an embodiment of the present invention. One feature of ultra-wideband communication systems is that highly accurate geographical positional information may be discernable from signals received from at least three ultra-wideband transmitters (e.g., 202, 204, 206) having known geographical positions. Typically, a device/transceiver (e.g., 208) having an unknown/undetermined location receives ultra-wideband signals from three fixed ultra-wideband transmitters, with the signals sent from each transmitter embedding its time of transmission and the geographical position of each respective transmitter. Using the known position of each fixed transmitter, and measuring the slight timing variations between received signals, the device with an unknown geographical location can triangulate and accurately determine its geographical position. Using such triangulation procedures, an ultra-wideband device can determine its geographical position to within a few centimeters.

Figure 3:
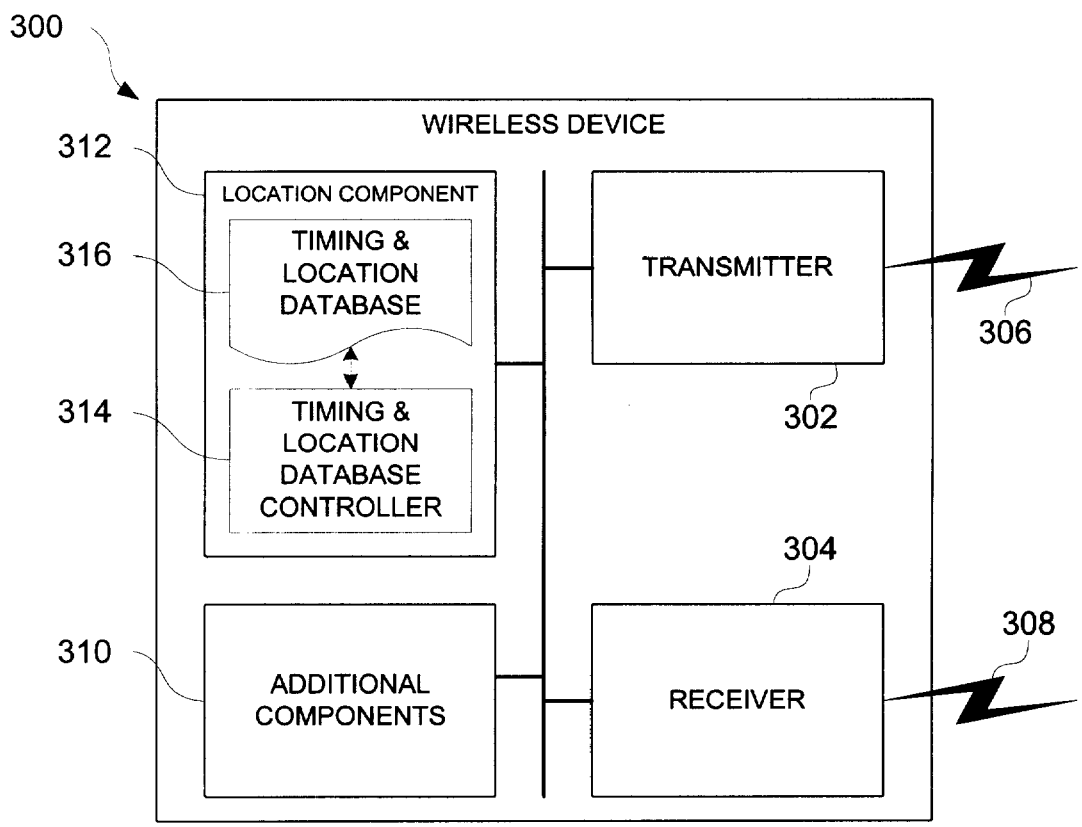
FIG. 3 is a schematic block diagram of an ultra-wideband wireless device/transceiver in accordance with an embodiment of the present invention.

As previously mentioned, in an aspect of the preset invention, the wireless devices may comprise impulse radio communication devices such as, for example ultra wideband radio (also know as digital pulse wireless) communication devices. FIG. 3 is a schematic block diagram of an ultra-wideband wireless device/transceiver 300 in accordance with an embodiment of the present invention. The device 300 has a plurality of components comprising logic (i.e., circuitry), software, or some combination of logic and software. In particular, the device 300 includes a transmitter and a receiver components 302, 304 capable of transmitting and receiving wireless signals 306, 308 (preferably ultra wideband radio communication signals) respectively. In one embodiment, the signals may carry digital data communication information which may be packetized according to known techniques.

The transmitter and a receiver components 302, 304 may also be coupled to additional components 310 included in the device 300. In an embodiment of the present invention, one of the additional components may comprise a location component 312. In an aspect of the present invention, the location component 312 may include a timing and location database controller 314 which manages and controls a timing and location database 316 in which information such a geo-positional may be stored.

In fixed ultra wideband transmission towers/base stations, their geographic position is known and can be stored in local memory. In mobile ultra wideband devices 300 that are within range of three or more fixed ultra wideband transmission towers, geo-positional information can be actively recorded, updated and stored this in the Dynamic Timing and Location Database 316 of the device 300 on an ongoing basis. Active updating and recording of geo-positional information can occur automatically on a pre-determined time interval, or queried on command.

For example, in an embodiment of the present invention, the location component 312 may receive signals from at least three other wireless devices and then use timing relationships and location information provided in these signals to accurately determine a location for the wireless device 300. With the exact location of the transceiver unit 300 known, and the location of the fixed transmitters known, the location component 312 may be able to precisely determine the distance from the wireless device 300 to the other wireless device. In some embodiments, this distance information, in turn, may be provided to the transmit component 302 so that it can be used to help more accurately adjust the level of power the transmit component uses to transmit the subsequent signals.

Figure 4:
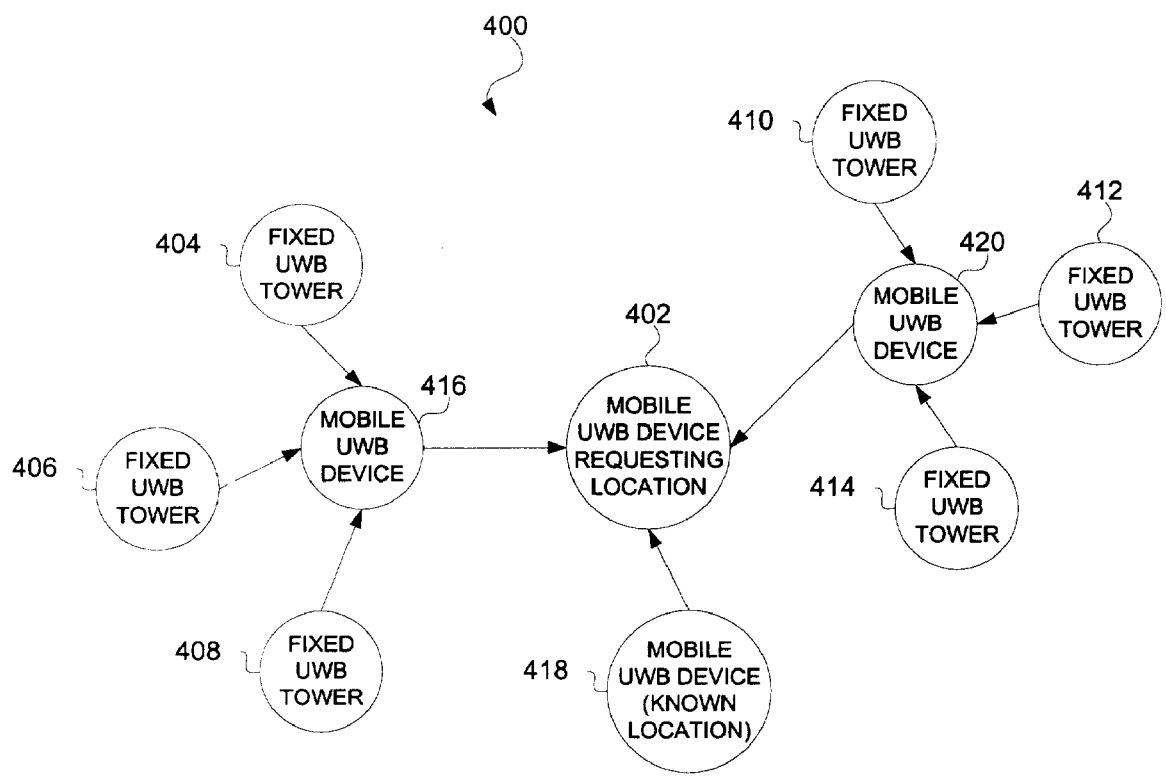
FIG. 4 is a schematic diagram of an ultra wideband geo-positional model where multiple mobile devices collaborate with a requesting device to allow the requesting device to determine its location in accordance with an embodiment of the present invention.

FIG. 4 is a schematic diagram of an ultra wideband geo-positional model 400 where multiple mobile devices collaborate with a requesting device to allow the requesting device to determine its location in accordance with an embodiment of the present invention. In embodiments of the present invention, tertiary mobile wireless devices (e.g., wireless device 402) that are not within range of three or more towers (e.g., transmission towers 404, 406, 408, 410, 412, 414) can request the geo-positional information stored in the Timing and Location Database of mobile ultra wideband devices (e.g., devices 416, 418, 420) that are in range and have already stored this information. Such tertiary mobile devices 402 can then use the results of their query of other mobile ultra wideband devices to triangulate their own position.

Figure 5:
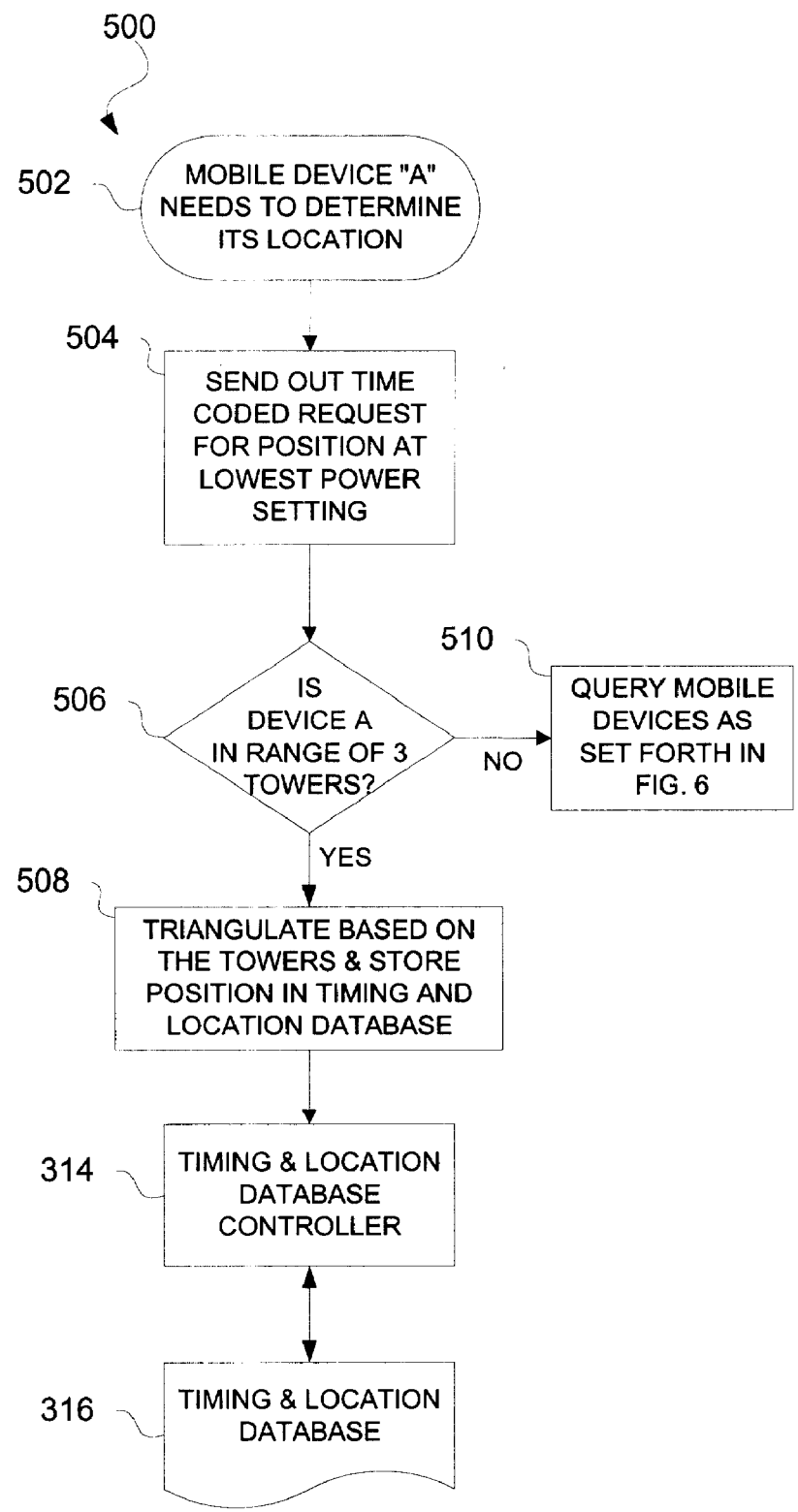
FIG. 5 is a flowchart of a process for triangulation and storage of the geo-positional information based on three fixed position devices in accordance with an embodiment of the present invention.

In an embodiment of the present invention, the geographic location of the first mobile wireless device may be determined just from information obtained from the fixed position wireless devices with known geographic locations utilizing a triangulation method if positioning information is received by the first mobile wireless device from a sufficient number (or more) of fixed position wireless devices with known geographic locations (e.g., such as when the sufficient number of fixed position wireless devices with known geographic locations are in the communication range of the first mobile wireless device). FIG. 5 is a flowchart of a process 500 for triangulation and storage of the geo-positional information based on three fixed position devices in accordance with an embodiment of the present invention.

When an individual mobile ultra wideband device A requires a location determination in operation 502, it transmits a coded request (in the form of a key sequence) for the geo-position of three other ultra wideband devices/towers whose position is known in operation 504. This request may be sent several times (polled) at a pre-selected lowest power setting. By starting key-sequence transmissions at the lowest possible power level, the key-sequence will only reach the smallest transmission range and potentially the smallest number of nearby ultra wideband devices that might respond to the key sequence request for information. The awaited responses are received in a pre-identified communications channel or set of such channels. If device A is in range of three towers (see decision 506), then it triangulates its own position in operation 508 based on the responses and time stamps, and stores this information in its timing and location database 316 via its timing and location database controller 314.

The timing and location database 316 of the responding ultra wideband device contains a position value and a time stamp that specifies the time that position value was obtained. In one implementation, the responding device may delay response to the requesting ultra wideband device until after the responding ultra wideband device has updated its own most recent geographic position. However, in a preferred implementation, the decision to use the position reported by the responding device lies with the requesting device. The requesting device makes this determination based on the time stamp and other information provided by the responding device. The moving/mobile nature of the responding ultra wideband devices and the need to synchronize the requesting device with the responding devices also complicate the determination of location.

Figure 6:
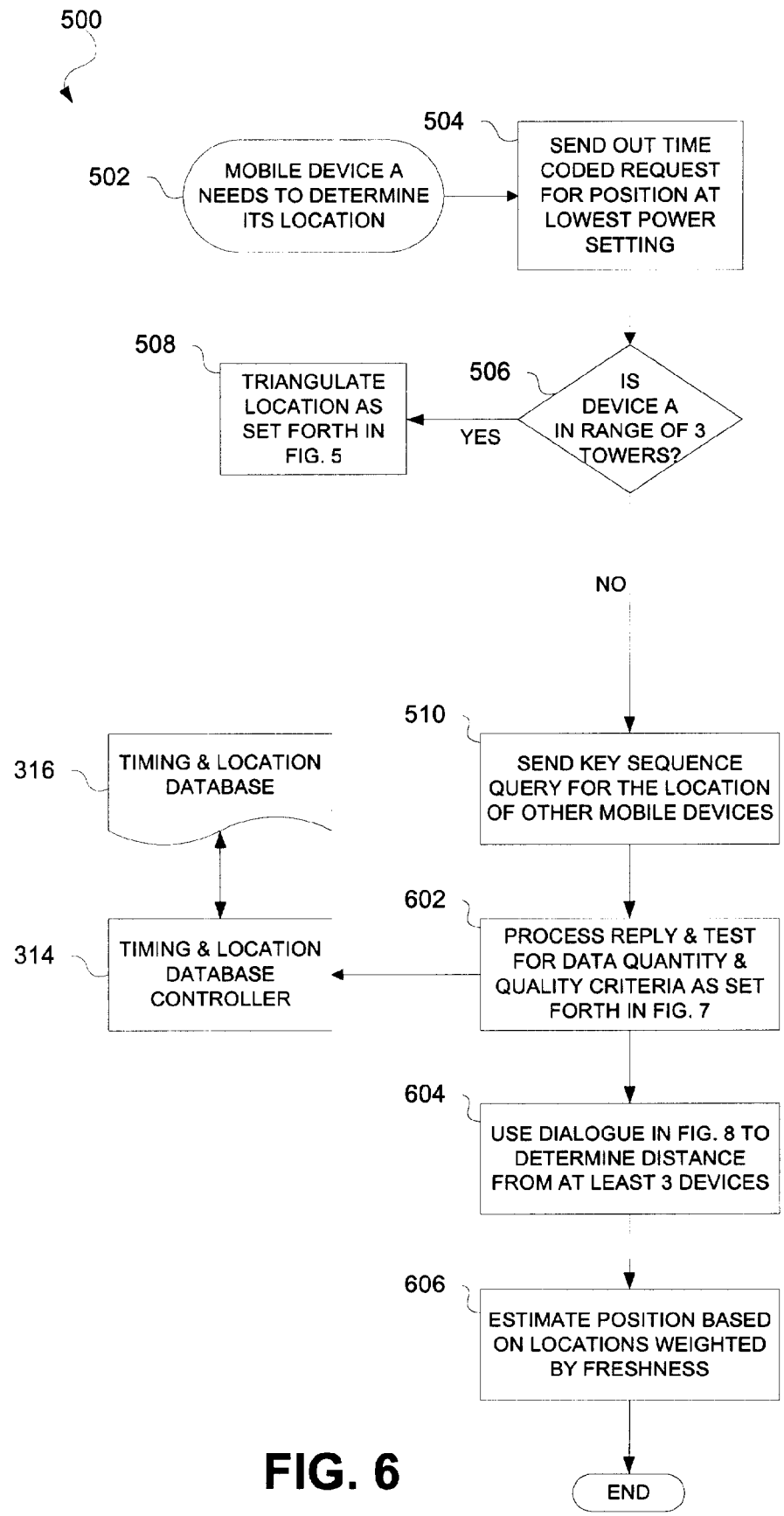
FIG. 6 is a flowchart of a process for determining and storing a geographic location of a mobile wireless device in a wireless communication system in accordance with an embodiment of the present invention.

If the querying wireless device (i.e., device A) is determined not to be in range of at least three towers in decision 506, then other wireless devices (e.g., other mobile wireless devices) proximate to the querying device may be queried per operation 510. In one embodiment of the present invention, the location of the first mobile wireless device may be estimated with a triangulation method using only the information obtained from the at least a portion of the responding other mobile wireless device if no positioning information is received by the first mobile wireless device from fixed position wireless devices with known geographic locations (i.e., zero (0) fixed position wireless devices). FIG. 6 is a flowchart of a process for determining and storing a geographic location of a mobile wireless device in a wireless communication system per operation 510 in accordance with an embodiment of the present invention. FIG. 6 shows the overall position discovery algorithm based on a requesting mobile device's ability to contact a suitably large number of location-self-aware devices. As was the case in FIG. 5, the device acquiring location is referred to as device A in FIG. 6.

Device "A" first tries to communicate with three or more base stations in order to triangulate its position (per operations 504, 506, 508). Since the base stations have exact location information and highly accurate timekeeping hardware, this may be the most accurate method of position determination. If fewer than three base stations are available (per decision 506), the device (i.e., device A) starts the request for information from other mobile devices by transmitting a key-sequence at the lowest possible power level per operation 510. In operation 602, replies are processed and tested for data quality and quantity criteria (preferably utilizing the timing and location database and controller 316, 314). In one aspect, each responding device may be identified by its unique ID number. Additionally, the range of IDs for base stations may not overlap those of mobile devices. If there are no replies, or if the replies contain data of low accuracy, device A keeps on polling for respondents. If polling the preprogrammed number of times fails to generate any replies, the requesting device may then ramp up the transmit power. In operation 604, a ranging dialogue is performed to determine the requesting wireless device's distance from other replying wireless devices in order to permit the estimation of the requesting wireless device's position in operation 606 based on the determined distances weighted by their freshness using a triangulation method. In an embodiment of the present invention, a time stamp for the estimated position/location may be generated, and then the estimated position/location and the associated time stamp may be stored in a memory (such as in a timing and location database) of the first mobile wireless device utilizing a timing and location database controller of the first mobile wireless device.

Figure 7:
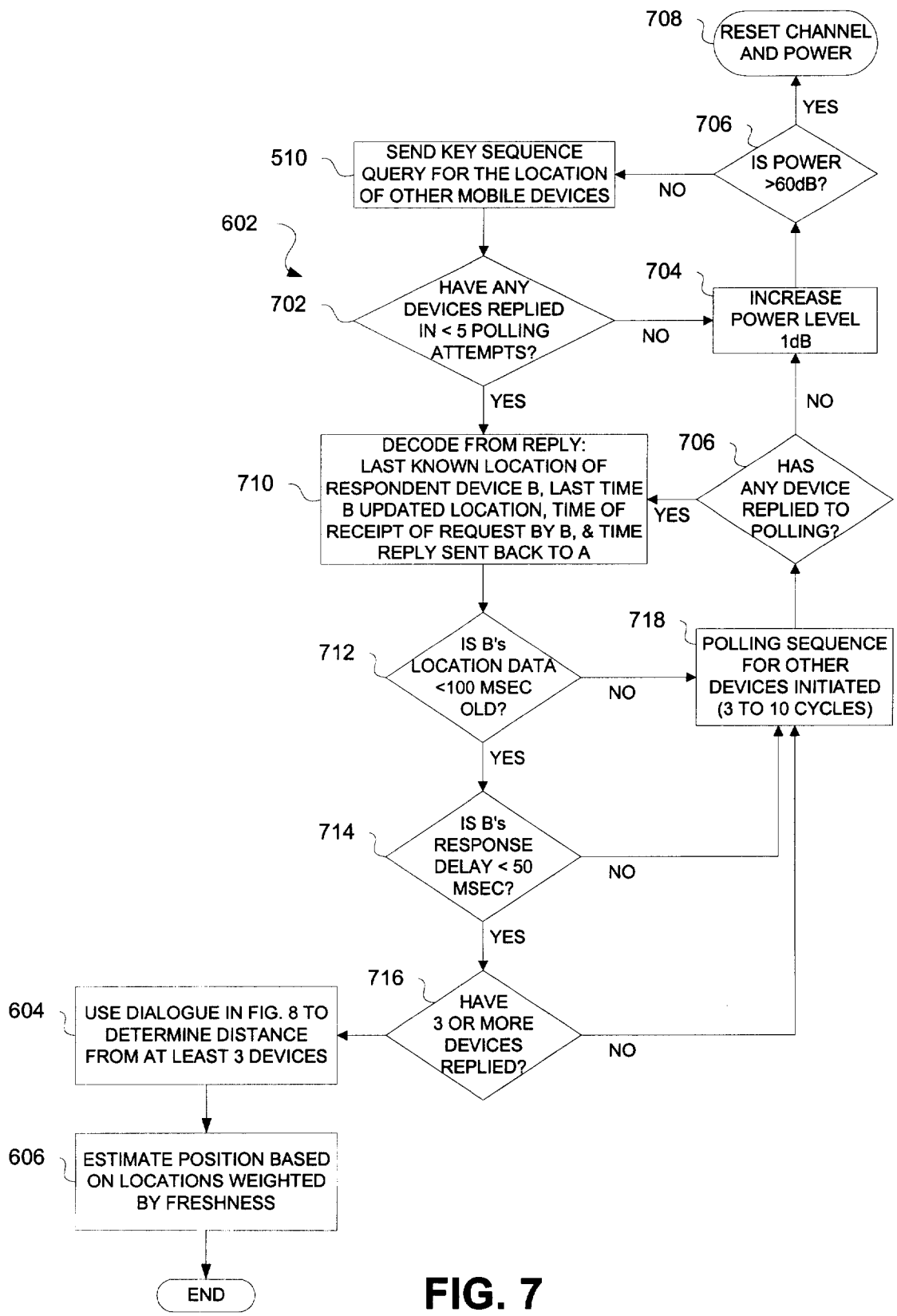
FIG. 7 is a flowchart processing replies from other wireless devices and testing for data quantity and quality criteria in accordance with an embodiment of the present invention.

FIG. 7 is a flowchart processing replies from other wireless devices and testing for data quantity and quality criteria per operation 604 of FIG. 6 in accordance with an embodiment of the present invention. As discussed previously, if device A is not in range of three towers, it then transmits the key sequence in order to locate other mobile devices per operation 510. As the other mobile devices respond, a dialogue is established between the requestor and each responding device to determine distance and clock disparity. If the requesting device does not receive a response in a reasonable time (in a preferred embodiment, up to 5 msec—depending on the environment), the requesting device will retry several times using the same power level and multiple access channels (see decision 702). If no devices have replied to this repeated polling, then a power ramping algorithm is initiated, and the keyed sequence is transmitted again at a higher power level (see operation 704). Once the maximum allowable power is reached without response (see decision 706), the requestor will switch to another multiple access channel in operation 708.

With continuing reference to FIG. 7, important data quality and quantity criteria are also used device A to determine the value of the data it receives. It should be noted that only other wireless devices that have acquired their position will respond to the query of operation 510. If there are no responses to the polling, device A boosts its output power level until another mobile device responds (per operation 708).

With reference to the YES path of decision 702, if a device proximate to the requesting device (i.e., device A) receives the request transmitted by device A and has acquired information concerning its own geographic position/location, then such a device may transmit a response to the device A (the responding mobile device will be referred to hereafter as device B). Device "B" may encode several pieces of information into its reply including, for example: (1) the freshness of its position information (i.e., how recently the position information was obtained and/or updated); (2) a time of receipt that the query from device A was received by device B; and (3) a time of reply that a reply to the to the query was transmitted from device B to device A. Upon receiving the reply, device A can decode the reply in order to obtain the encoded information in operation 710.

With continuing reference to FIG. 7, the information obtained from each reply to the request by device A can be tested to determine how much emphasis should put on the information provided in the response of the particular device B. In decision 712, the information from a device B may be tested to determine whether the position information of device B is stale (i.e., too old and/or has not been updated recently). Clearly, if device B has not updated its information in a long time (for example, in a preferred embodiment, longer than 100 msec), the location of device B may have incurred significant error.

Next, in decision 714, the information decoded from the response may be tested to determine if the delay taken by device B in responding to the request is above a predetermined threshold (e.g., in a preferred embodiment, greater than 50 msec). For example, if device B took an inordinate amount of time to process the query (hereafter referred to as processing time), device B may be overloaded and prone to thread conflicts that will induce timing errors. In such a case, device B's reply will not be as accurate as device A may require. After performing the tests in decisions 712 and 714, a subsequent determination is made by device A as to whether the replies of three or more devices (i.e., three or more device B's) have been received by device A in decision 716. If three or more device B's have replied and at least three of the replies pass the tests set forth in decisions 712 and 714 (see the YES paths of decisions 712 and 714), then the dialog to determine device A's distance from three other devices may be executed per the YES path of decision 716 and operation 604. Conversely, if the information of a reply fails either of the tests (see the NO paths of decisions 712 and 714), or the replies of less than three device B's have past the tests, then per operation 718, a polling sequence for other devices is initiated.

There are several circumstances where distance calculation based on nearby devices may be prone to certain types of error. For some responding devices the processing delay experienced by device B will be a multiple of the signal's propagation delay. In such cases, the response by "B" may be degraded by simultaneous occurring multi-path reflections from the original query. In such cluttered environments, where reflection of the query may return to "A" at the same time as the reply from "B", it becomes necessary to re-query "B" and notify it of the multi-path duration. Once "B" receives this information it can resubmit its reply so it will not be degraded by multi-path. On the other hand, if "A" calculates device B to be very far away, then the possibility increases that the reception is not direct line, and significant error is highly probable.

Once three or more devices have replied, then an estimated position can be obtained per 606. If more than three devices reply to the query, a determination can be made based on the information provided by the responding devices as to the quality of the estimated distances. Any devices over the required three can be graded and then added to the estimate weighted by a quality factor calculated from the time of last update, chance of multi-path interference, replier overload, and distance degradation.

In yet another aspect of the present invention, the obtained information relating to the distance between the first mobile wireless device and the portion of the responding other mobile wireless devices may include a calculated distance between the first mobile wireless device and the portion of the responding other mobile wireless devices, a transmission time, and a scaling factor.

Figure 8:
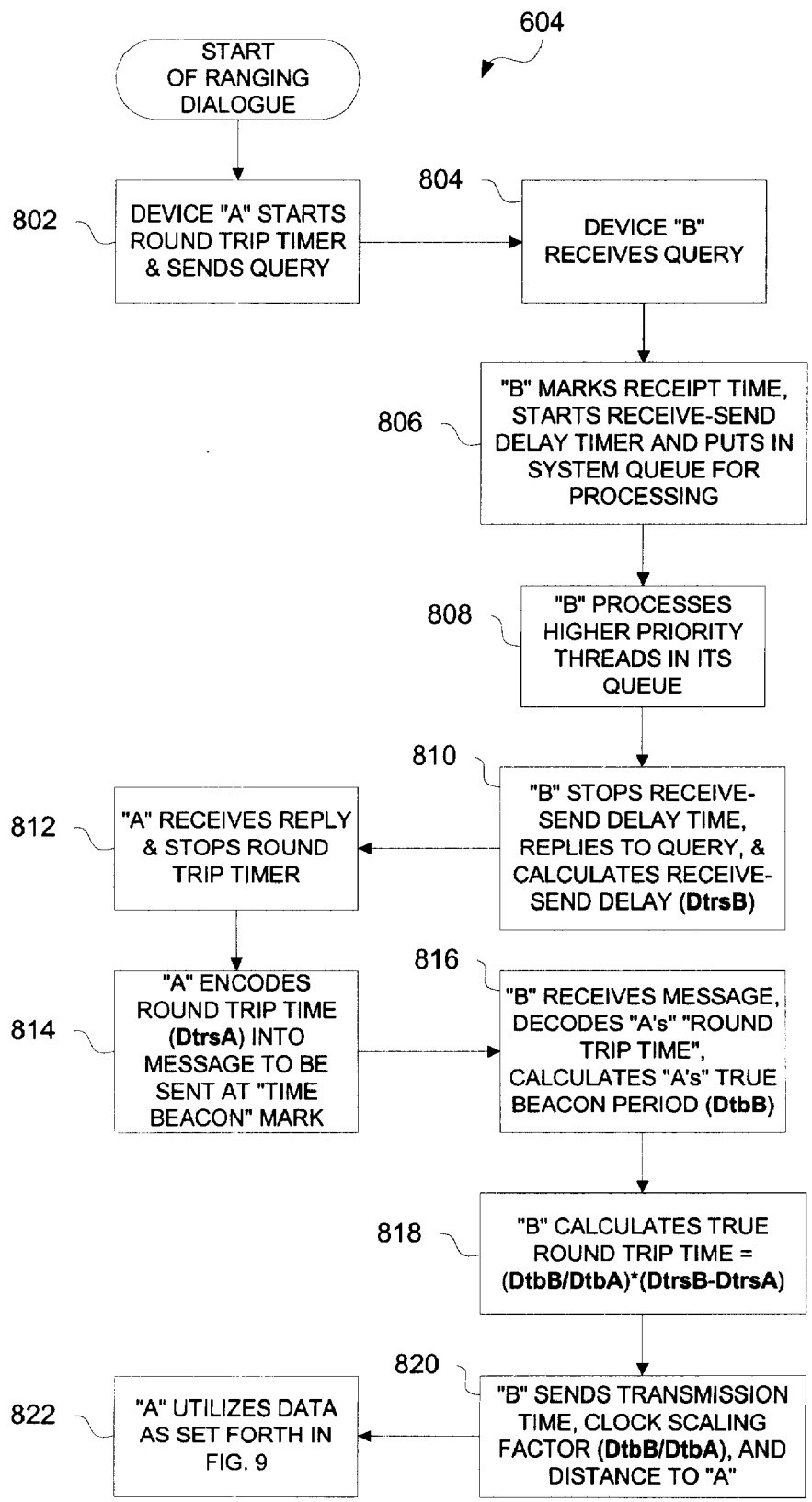
FIG. 8 is a flowchart of a process for performing a ranging dialogue to determine a requesting wireless device's distance from other replying wireless devices in accordance with an embodiment of the present invention.

FIG. 8 is a flowchart of a process for performing a ranging dialogue to determine a requesting wireless device's distance from other replying wireless devices per operation 604 in accordance with an embodiment of the present invention. FIG. 8 shows the dialogue that must go on in order for device A to determine its position with respect to device B. In operation 802, device A starts a timer that is used to count the clock ticks between the time device A sends a query and the time "A" receives a response from "B". This time is denoted as "$\Delta_{tsrA}$" (or "DtrsA"). This time includes the round trip signal time plus the time it takes for device B to respond to the query (a substantial delay given that device B is likely to be busy at the time the query is received). Since the oscillator on device A may have undergone some drift since the last time device A's position was determined, $\Delta_{trsA}$ is only an estimate of the true round trip time.

Once device B receives the query in operation 804, device B marks the receipt time, starts the receive-send delay timer and continues processing those threads that were being processed at the time it received the query until it has enough time to respond to the query (see operations 806 and 808). When device B is ready to respond to the query, "B" stops the timer and calculates the receive-send delay "$\Delta_{trsB}$" (or "DtrsB") and A's time scaling factor in operation 810.

In operation 812, device A receives the reply, stops the round trip timer, and calculates the round-trip time "$\Delta_{tsrA}$" (or "DtrsA"). Device A then encodes this value into a message to be sent to device B at its next "time beacon" mark in operation 814. A time beacon mark occurs at the end of a specified time period that starts with the sending of the original query. The time beacon period may either be a preprogrammed constant for both devices A and B, or its value may be transmitted by devices A to B in the initial query.

In operation 816, device B receives the message and decodes the round trip time. Device B then calculates the time difference between the original query and the reply at the "time beacon" mark to calculate the true beacon period ("DtbB") (see operation 816). In operation 818, device B then uses the ratio of the beacon period preprogrammed in device A to the true beacon period as calculated by device B as a multiplier (i.e., the "scaling factor") to correct the round trip time as calculated by device A. Once the actual time is obtained, the receive-send delay incurred by device B can be subtracted out to obtain the actual round trip propagation time. Device B then sends the scaling factor, transmission time and calculated distance to device A in operation 820. In operation 822, upon receipt, device A may use this information transmitted from device B for time correction.

Figure 9:
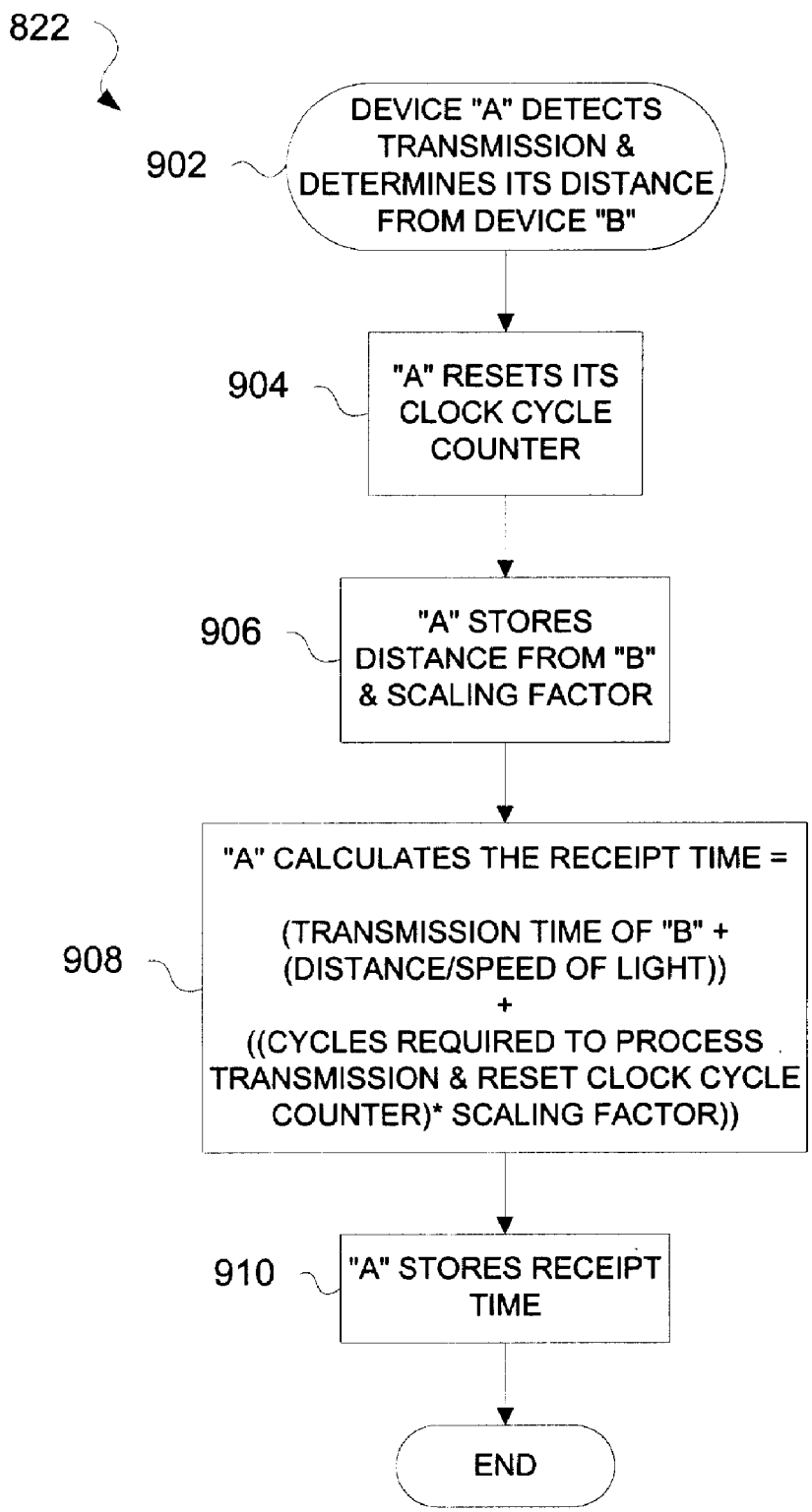
FIG. 9 is a flowchart of a process for time correction in a requesting wireless device in accordance with an embodiment of the present invention.

FIG. 9 is a flowchart of a process for time correction in a requesting wireless device per operation 822 of FIG. 8 in accordance with an embodiment of the present invention. As set forth in FIG. 9, shows that as soon as device A receives the transmission from device B (see operation 902), device A resets its clock cycle counter in operation 904. Device A then decodes the transmission and extracts the parameters for storage in its timing and location database (see operation 906).

Besides updating its location, device A can use these parameters to resynchronize its clock. In one aspect of the present invention, at least a portion of the obtained information (such as the transmission time and scaling factor) may be utilized to update an internal clock of the first mobile wireless device. In closer detail, this may be accomplished per operation 908 by calculating a Receipt Time using the following equation:

Receipt Time=(transmission time of device B+distance/speed of light)+(time required to process transmission and reset clock cycle counter), where:

(time required to process transmission and reset clock cycle counter)=((cycles required to process transmission and reset the clock cycle counter)*(scaling factor)

Device "A" then stores the calculated Receipt Time in operation 910. Subsequent time calculations by device A are then based on the following equation:

True Current Time=(value of clock cycle counter)*(scaling factor)+(Receipt Time)+(number of cycles to calculate and process (transmit, store, etc.) True Current Time)

In multi-user environments, it is feasible that dozens of ultra wideband devices may be within transmit/receive range of the location-requesting ultra wideband device. Simultaneous responses from all of these devices can "collide" and prove to be unintelligible to the requesting device. In an aspect of the present invention, a set of collision-avoidance schemes may be provided which are designed to reduce collisions when an individual ultra wideband device requests geopositional information from multiple nearby ultra wideband devices in a multi-user environment.

Implementations of collision avoidance schemes may employ the following:

1. Pre-identification of several multiple access channels to be used for receiving responses to the geo-positional key sequence and assign one of these channels to each mobile device. This reduces but does not eliminate the possibility that multiple responses to the key sequence request will be received in the same channel;

2. Superposition of multiple coincident responses using pulse position modulation (a preferred modulation scheme) may lead to disallowed pulse adjacency at the receiver. If this happens, the requesting device may ignore the reply. The responding devices expect a rapid acknowledgement from the requesting device (up to 5 msec depending on the environment). The lack of a prompt acknowledgement from the requesting device may induce the responding devices to retransmit their responses using other pre-identified multiple access channels assigned for positional response information. To decrease the probability that second responses from multiple devices will interfere with each other, these multiple access channels can be chosen at random and/or the transmission can be postponed by random delays. These random factors can be obtained by using a random number generator where the seed is based on an individual device's unique identification code. The individual device's ID codes can also be used directly to institute a lag that is unique to each device; and 3. The geo-positional key sequence may be generated at the lowest possible power level, and the power level is increased only after between 3 and 10 polling sequences have been transmitted with no response. The power ramping and polling sequence proceeds until the first response is obtained or until the assigned maximum power level has been reached. The power level is increased gradually such that the potential number of new respondents is kept low while insuring the minimum number or respondents, three, is achieved as rapidly as possible. After maximum power is reached with no response, the ultra wideband device will then switch channels and start the polling and power ramping sequence again at the lowest power setting.

Embodiments may also include a repetitive polling sequence that helps to assure that a potential respondent will be able to receive the request. Since the requesting device expect a rapid acknowledgement from the responding devices, if the requesting devices do not receive such an acknowledgement in a reasonable time (up to 5 msec depending on the environment), then the requestor will retry up to 10 polling sequences before ramping up the power or moving to another multiple access channel.

Additionally, embodiments may provide a means to simultaneously synchronize the users clock and calculate the distance based on one round trip from the responding device.

Thus embodiments of the present invention may allow for the employment of geo-positional information in a broader range of environments. It uses and "piggybacks" the existence of multi-user environments to extend the capacity of the ultra wideband system. It extends the capacity for acquisition of geo-positional information throughout a multi-user ultra wideband environment. Aspects of the present invention may also help to reduce the probability of collisions in multi-user environments. The ability to extend geo-positional functionality under a wider variety of circumstances may become a future requirement of FCC regulations under extension of their "e911" policy.

Figure 10:
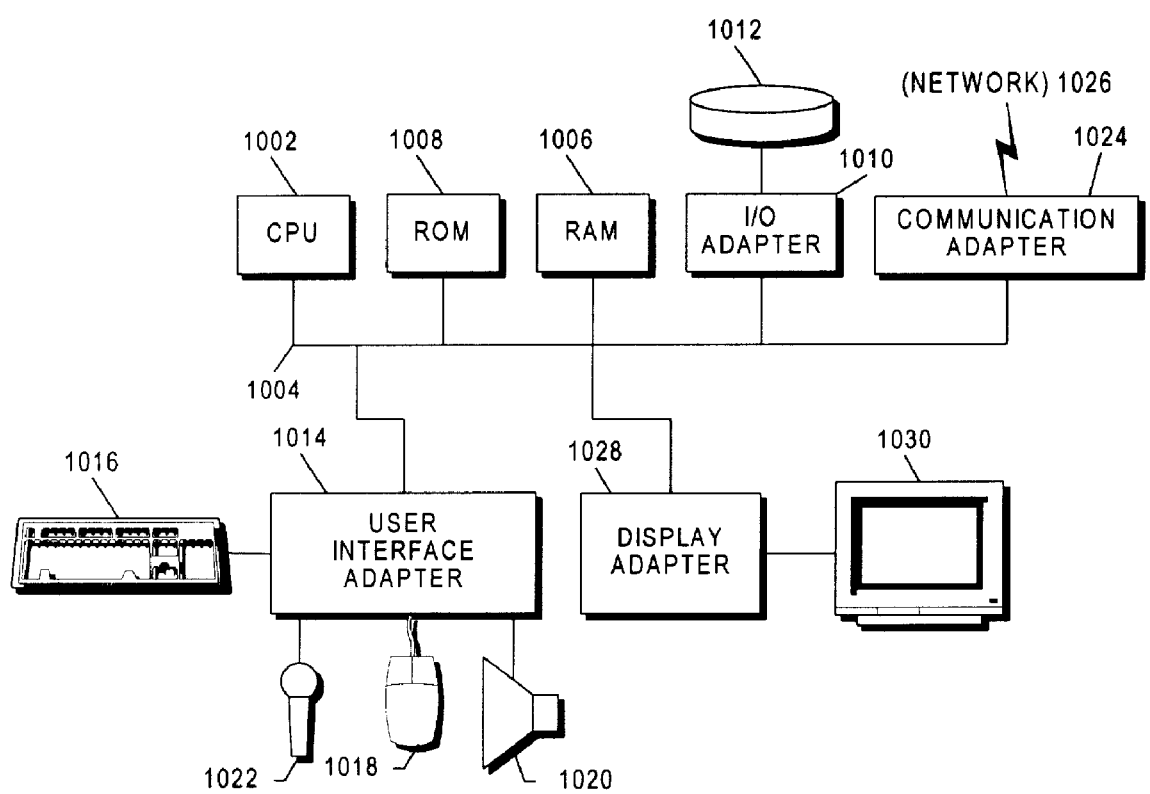
FIG. 10 is a schematic diagram of a representative hardware environment in accordance with an embodiment of the present invention.

FIG. 10 illustrates a representative hardware environment 1000 by which embodiments of the present invention may be carried out is depicted in FIG. 10. In the present description, the various sub-components of each of the components may also be considered components of the system. For example, particular software modules executed on any component of the system may also be considered components of the system. The hardware configuration 1000 illustrated in FIG. 10 includes a central processing unit 1002, such as a microprocessor, and a number of other units interconnected via a system bus 1004.

The hardware configuration 1000 shown in FIG. 10 includes a Random Access Memory (RAM) 1006, Read Only Memory (ROM) 1008, an I/O adapter 1010 for connecting peripheral devices such as disk storage units 1012 to the bus 1004, a user interface adapter 1014 for connecting a keyboard 1016, a mouse 1018, a speaker 1020, a microphone 1022, and/or other user interface devices such as a touch screen (not shown) to the bus 1004, communication adapter 1024 for connecting the hardware configuration to a communication network 1026 (e.g., a data processing network) and a display adapter 1028 for connecting the bus 1004 to a display device 1030.

An embodiment of the present invention may be written using JAVA, C, and the C++ language and utilize object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can-represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use.

Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for determining a location of a wireless device, comprising:
   transmitting an initial request to wireless devices having known locations for positioning information for determining a location of a first wireless device having an undetermined location, wherein wireless devices having known locations that receive the initial request transmit positioning information to the first wireless device;
   if positioning information from less than a sufficient number of wireless devices of known location is received by the first mobile wireless device, transmitting an additional request for responses from other wireless devices that may derive their own location from even more distant known-location wireless devices;
   receiving responses to the request from one or more of these responding other wireless devices;
   communicating with at least a portion of the responding other wireless devices to obtain information relating to the distance between the first wireless device and the at least a portion of the responding other wireless devices; and
   estimating a location of the first wireless device using the information obtained from the at least a portion of the responding other wireless device and the positioning information received from the less than sufficient number of wireless devices having known locations.

2. The method of claim 1, further comprising storing the estimated location in a memory of the first wireless device.

3. The method of claim 1, further comprising determining the location of the first wireless device from information obtained from the wireless devices having known locations utilizing if positioning information is received from the sufficient number of wireless devices having known locations.

4. The method of claim 1, wherein the sufficient number of wireless devices having known locations comprises at least three wireless devices having known locations.

5. The method of claim 1, wherein at least a portion of the transmitted requests are coded.

6. The method of claim 1, wherein the additional request is re-transmitted periodically a predetermined number of times.

7. The method of claim 6, wherein the additional request is re-transmitted at a higher power level if an insufficient number of responses are received in response to the previous transmission of the additional request.

8. The method of claim 1, wherein the obtained information relating to the distance between the first wireless device and the at least a portion of the responding other wireless devices includes a calculated distance between the first wireless device and the at least a portion of the responding other wireless devices, and a scaling factor.

9. The method of claim 1, further comprising utilizing the obtained information to update an internal clock of the first wireless device.

10. The method of claim 1, wherein at least a portion of the wireless devices comprise impulse radio devices.

11. The method of claim 1, wherein the location of the first wireless device is estimated using only the information obtained from the at least a portion of the responding other wireless device if no positioning information is received by the first mobile wireless device from wireless devices having known locations.

12. A system for determining a location of a wireless device, comprising:
   logic for transmitting an initial request to wireless devices having known locations for positioning information for determining a location of a first wireless device having an undetermined location, wherein wireless devices having known locations that receive the initial request transmit positioning information to the first wireless device;

if positioning information from less than a sufficient number of wireless devices of known location is received by the first mobile wireless device, logic for transmitting an additional request for responses from other wireless devices having known locations;

logic for receiving responses to the request from one or more of these other wireless devices;

logic for communicating with at least a portion of these other wireless devices to obtain information relating to the distance between the first wireless device and the at least a portion of these other wireless devices; and logic for estimating a location of the first wireless device using the information obtained from the at least a portion of the other wireless devices and the positioning information received from the less than sufficient number of wireless devices having known locations.

13. The system of claim 12, further comprising logic for storing the estimated location in a memory of the first wireless device.

14. The system of claim 12, further comprising logic for determining the location of the first wireless device from information obtained from the wireless devices having known locations utilizing if positioning information is received from the sufficient number of wireless devices having known locations.

15. The system of claim 12, wherein the sufficient number of wireless devices having known locations comprises at least three wireless devices having known locations.

16. The system of claim 12, wherein at least a portion of the transmitted requests are coded.

17. The system of claim 12, wherein the additional request is re-transmitted periodically a predetermined number of times.

18. The system of claim 17, wherein the additional request is re-transmitted at a higher power level if an insufficient number of responses are received in response to the previous transmission of the additional request.

19. The system of claim 12, wherein the obtained information relating to the distance between the first wireless device and the at least a portion of these responding other wireless devices includes a calculated distance between the first wireless device and the at least a portion of these responding other wireless devices, and a scaling factor.

20. The system of claim 12, further comprising logic for utilizing the obtained information to update an internal clock of the first wireless device.

21. The system of claim 12, wherein at least a portion of the wireless devices comprise impulse radio devices.

22. The system of claim 12, wherein the location of the first wireless device is estimated using only the information obtained from the at least a portion of the responding other wireless device if no positioning information is received by the first mobile wireless device from wireless devices having known locations.

23. A computer program product for determining a location of a wireless device, comprising:

computer code for transmitting an initial request to wireless devices having known locations for positioning information for determining a location of a first wireless device having an undetermined location, wherein wireless devices having known locations that receive the initial request transmit positioning information to the first wireless device;

if positioning information from less than a sufficient number of wireless devices of known location is received by the first mobile wireless device, computer code for transmitting an additional request for responses from other wireless devices having known locations;

computer code for receiving responses to the request from one or more of these other wireless devices;

computer code for communicating with at least a portion of these other wireless devices to obtain information relating to the distance between the first wireless device and the at least a portion of these other wireless devices; and computer code for estimating a location of the first wireless device using the information obtained from the at least a portion of the other wireless devices and the positioning information received from the less than sufficient number of wireless devices having known locations.

24. The computer program product of claim 23, further comprising computer code for storing the estimated location in a memory of the first wireless device.

25. The computer program product of claim 23, further comprising computer code for determining the location of the first wireless device from information obtained from the wireless devices having known locations utilizing if positioning information is received from the sufficient number of wireless devices having known locations.

26. The computer program product of claim 23, wherein the sufficient number of wireless devices having known locations comprises at least three wireless devices having known locations.

27. The computer program product of claim 23, wherein at least a portion of the transmitted requests are coded.

28. The computer program product of claim 23, wherein the additional request is re-transmitted periodically a predetermined number of times.

29. The computer program product of claim 28, wherein the additional request is re-transmitted at a higher power level if an insufficient number of responses are received in response to the previous transmission of the additional request.

30. The computer program product of claim 23, wherein the obtained information relating to the distance between the first wireless device and the at least a portion of these responding other wireless devices includes a calculated distance between the first wireless device and the at least a portion of these responding other wireless devices, and a scaling factor.

31. The computer program product of claim 23, further comprising computer code for utilizing the obtained information to update an internal clock of the first wireless device.

32. The computer program product of claim 23, wherein at least a portion of the wireless devices comprise impulse radio devices.

33. The computer program product of claim 23, wherein the location of the first wireless device is estimated using only the information obtained from the at least a portion of the responding other wireless device if no positioning information is received by the first mobile wireless device from wireless devices having known locations.

* * * * *